United States Patent
Park et al.

(10) Patent No.: US 9,576,730 B2
(45) Date of Patent: Feb. 21, 2017

(54) DIELECTRIC CERAMIC COMPOSITION, DIELECTRIC MATERIAL, AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Yun Jung Park, Suwon-Si (KR); Seok Hyun Yoon, Suwon-Si (KR); Chang Hoon Kim, Suwon-Si (KR); Song Je Jeon, Suwon-Si (KR); No Hoon Park, Suwon-Si (KR); Soo Kyong Jo, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/878,941

(22) Filed: Oct. 8, 2015

(65) Prior Publication Data

US 2016/0217923 A1    Jul. 28, 2016

(30) Foreign Application Priority Data

Jan. 27, 2015    (KR) ........................ 10-2015-0012910

(51) Int. Cl.
*C04B 35/468* (2006.01)
*H01G 4/12* (2006.01)
*H01G 4/30* (2006.01)

(52) U.S. Cl.
CPC ......... *H01G 4/1227* (2013.01); *C04B 35/4682* (2013.01); *H01G 4/30* (2013.01)

(58) Field of Classification Search
CPC .. C04B 35/468; C04B 35/4682; H01G 4/1227
See application file for complete search history.

(56) References Cited

U.S. PATENT DOCUMENTS

| | | | |
|---|---|---|---|
| 8,014,126 B2 * | 9/2011 | Sato ..................... | B82Y 30/00 361/306.1 |
| 8,791,625 B2 * | 7/2014 | Kounga Njiwa ..... | C04B 35/462 252/62.9 PZ |

(Continued)

FOREIGN PATENT DOCUMENTS

| | | | |
|---|---|---|---|
| JP | 2013063874 | * | 4/2013 |
| JP | 2013063876 | * | 5/2013 |

(Continued)

OTHER PUBLICATIONS

Bratton et al "Phase Transitions in the Sydtem BaTiO3-KNbO3" J. Am.Ceramic Society vol. 50 No. 2 (Feb. 1967).*

*Primary Examiner* — Karl Group
(74) *Attorney, Agent, or Firm* — McDermott Will & Emery LLP

(57) ABSTRACT

A dielectric ceramic composition contains a base material main ingredient and an accessory ingredient. The base material main ingredient includes a first base material main ingredient containing $BaTiO_3$ and a second base material main ingredient containing $(Na_{1-y}K_y)NbO_3$. The base material main ingredient is represented by $(1-x)BaTiO_3$-$x(Na_{1-y}K_y)NbO_3$, in which x and y satisfy $0.005 \leq x \leq 0.5$ and $0.3 \leq y \leq 1.0$, respectively.

13 Claims, 1 Drawing Sheet

(56) References Cited

U.S. PATENT DOCUMENTS

| | | | |
|---|---|---|---|
| 2009/0236943 A1* | 9/2009 | Tanaka | C04B 35/4682 310/358 |
| 2012/0098386 A1* | 4/2012 | Kounga Njiwa | C04B 35/462 310/311 |
| 2013/0083449 A1* | 4/2013 | Yoon | C04B 35/4682 361/321.4 |
| 2014/0313634 A1* | 10/2014 | Yoon | H01G 4/1227 361/301.4 |
| 2016/0163457 A1* | 6/2016 | Yoon | H01G 4/1227 361/301.4 |

FOREIGN PATENT DOCUMENTS

| | | |
|---|---|---|
| JP | 5515979 B2 | 6/2014 |
| KR | 1999-0075846 A | 10/1999 |
| KR | 10-2010-0042567 A | 4/2010 |

* cited by examiner

A – A'

US 9,576,730 B2

DIELECTRIC CERAMIC COMPOSITION, DIELECTRIC MATERIAL, AND MULTILAYER CERAMIC CAPACITOR CONTAINING THE SAME

CROSS-REFERENCE TO RELATED APPLICATION

This application claims the priority and benefit of Korean Patent Application No. 10-2015-0012910 filed on Jan. 27, 2015, with the Korean Intellectual Property Office, the disclosure of which is incorporated herein by reference.

BACKGROUND

The present disclosure relates to a dielectric ceramic composition and a dielectric material capable of ensuring X8R temperature characteristics and reliability, and a multilayer ceramic capacitor containing the same.

Electronic components using a ceramic material, such as capacitors, inductors, piezoelectric elements, varistors, thermistors, and the like, include a ceramic body formed of a ceramic material, internal electrodes formed in the ceramic body, and external electrodes mounted on surfaces of the ceramic body so as to be connected to the internal electrodes.

Among ceramic electronic components, a multilayer ceramic capacitor (MLCC) includes a plurality of stacked dielectric layers, internal electrodes disposed to face each other with one of the dielectric layers interposed therebetween, and external electrodes electrically connected to the internal electrodes.

In general, the multilayer ceramic capacitor is manufactured by stacking a paste for an internal electrode and a paste for a dielectric layer in a sheet method, a printing method, or the like, and simultaneously sintering the stacked pastes.

A dielectric material used in a high-capacitance multilayer ceramic capacitor according to the related art, which is a barium titanate ($BaTiO_3$)-based ferroelectric material, has high permittivity at room temperature, a low dissipation factor, and excellent insulation resistance characteristics.

However, the barium titanate ($BaTiO_3$)-based dielectric material has a problem in satisfying X8R characteristics, which are capacitance temperature characteristics at a temperature of, at most, 150° C., and guaranteeing reliability.

SUMMARY

An aspect of the present disclosure may provide a novel dielectric ceramic composition and a dielectric material capable of ensuring X8R temperature characteristics and reliability, and a multilayer ceramic capacitor containing the same.

According to an aspect of the present disclosure, a dielectric ceramic composition may contain a base material main ingredient containing $BaTiO_3$ and $(Na_{1-y}K_y)NbO_3$, wherein x and y satisfy $0.005 \leq x \leq 0.5$ and $0.3 \leq y \leq 1.0$, respectively.

According to another aspect of the present disclosure, a multilayer ceramic capacitor may include a ceramic body in which dielectric layers and first and second internal electrodes are alternately stacked, and first and second external electrodes formed on outer surfaces of the ceramic body and electrically connected to the first and second internal electrodes. The dielectric layers may be formed of the dielectric ceramic composition as described above.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
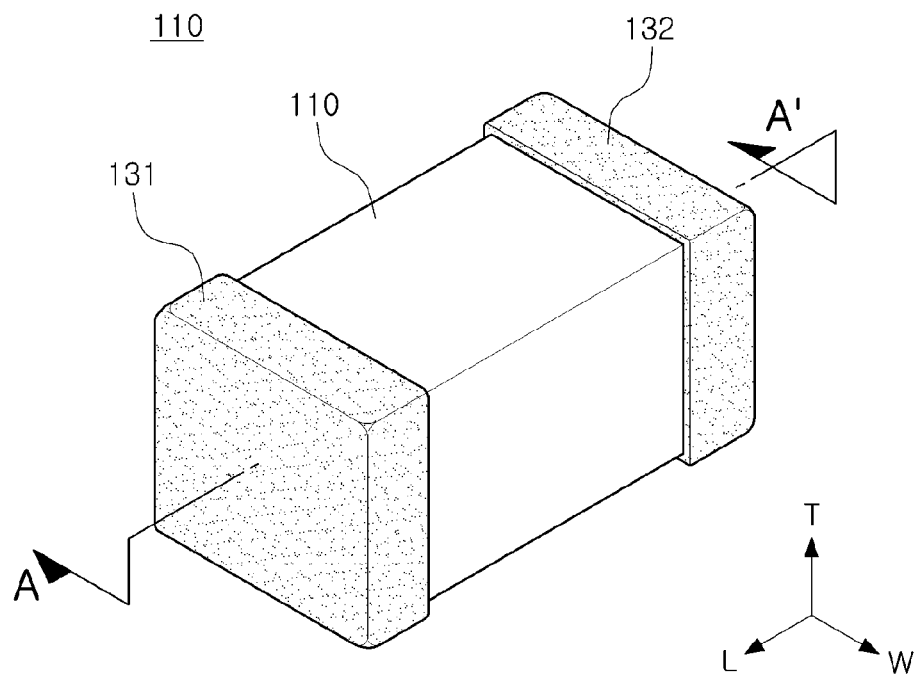
FIG. 1 is a schematic perspective view of a multilayer ceramic capacitor according to another exemplary embodiment in the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric ceramic composition. Examples of an electronic component containing the dielectric ceramic composition include a capacitor, an inductor, a piezoelectric element, a varistor, a thermistor, and the like. Hereinafter, the dielectric ceramic composition and a multilayer ceramic capacitor as an example of the electronic component will be described.

The dielectric ceramic composition, according to an exemplary embodiment, may contain a base material main ingredient and an accessory ingredient. The base material main ingredient may include a first base material main ingredient containing $BaTiO_3$ and a second base material main ingredient containing $(Na_{1-y}K_y)NbO_3$. The base material main ingredient may be represented by $(1-x)BaTiO_3$-$x(Na_{1-y}K_y)NbO_3$, in which x and y satisfy $0.005 \leq x \leq 0.5$ and $0.3 \leq y \leq 1.0$, respectively.

The dielectric ceramic composition, according to the exemplary embodiment, may satisfy the X5R (−55° C.~85° C.), X7R (−55° C.−125° C.), and X8R (−55° C.−150° C.) characteristics of Electronic Industries Alliance (EIA) standard.

According to the exemplary embodiment, a Curie temperature of the base material main ingredient powder may be increased, and permittivity at a high temperature may become uniform, and thus X8R temperature characteristics and excellent high-temperature reliability may be implemented.

According to the exemplary embodiment, a dielectric ceramic composition capable of using nickel (Ni) as an internal electrode and being sintered at 1300° C. or less under a reducing atmosphere at which nickel (Ni) is not oxidized may be provided.

Further, according to exemplary embodiments, a dielectric material formed by sintering the dielectric ceramic composition and a multilayer ceramic capacitor using the dielectric ceramic composition may be provided.

The multilayer ceramic capacitor, according to the exemplary embodiment, may satisfy the temperature characteristics and have excellent reliability.

According to the exemplary embodiment, in a case of mixing $BaTiO_3$ and $(Na,K)NbO_3$ at a suitable ratio or forming a solid-solution using $BaTiO_3$ and $(Na,K)NbO_3$ and adding small amounts of accessory ingredients to manufacture a sintered body, permittivity of 1500 or more, excellent insulation resistance characteristics, and X8R temperature characteristics may be implemented.

In a case of adding $CaZrO_3$ and an excessive amount of a rare earth element to $BaTiO_3$ in order to satisfy high-temperature characteristics (X8R characteristics), even though the high-temperature characteristics are implemented, since a Curie temperature of the base material itself is 125° C., there is a limitation in improving temperature coefficient of capacitance (TCC) characteristics.

However, in a case of using a $BaTiO_3$—$(Na,K)NbO_3$ solid solution having a high Curie temperature as a base material as in the exemplary embodiment, even if $CaZrO_3$ or an excessive amount of a rare earth element is not added, X8R characteristics may be implemented, and excellent TCC characteristics may be implemented as compared to a case of applying an existing $BaTiO_3$ base material.

Therefore, the multilayer ceramic capacitor using the dielectric ceramic composition according to the exemplary embodiment may satisfy the high-temperature characteristics (X8R characteristics) and implement excellent high-temperature temperature coefficient (TCC) of capacitance characteristics.

Further, according to the exemplary embodiment, a dielectric ceramic composition capable of implementing high-temperature reliability, permittivity, and sintering characteristics and satisfying high-temperature characteristics (X8R characteristics) may be provided by adjusting contents of the accessory ingredients.

The dielectric ceramic composition, according to the exemplary embodiment, may contain the base material main ingredient and the accessory ingredients, wherein the accessory ingredients may include first to third accessory ingredients.

Hereinafter, each ingredient of the dielectric ceramic composition according to the exemplary embodiment will be described in detail.

a) Base Material Main Ingredient

The dielectric ceramic composition, according to the exemplary embodiment, may contain the base material main ingredient.

According to the exemplary embodiment, the base material main ingredient may include a first base material main ingredient represented by $BaTiO_3$ and a second base material main ingredient represented by $(Na_{1-y}K_y)NbO_3$.

The first and second base material main ingredients may be mixed with each other or formed as a solid solution.

The base material main ingredient may be contained in powder form.

According to the exemplary embodiment, when a molar ratio of the first base material main ingredient is 1−x, and a molar ratio of the second base material main ingredient is x, x may satisfy $0.005 \leq x \leq 0.5$.

When the base material main ingredient including the first and second base material main ingredients is represented by $(1-x)BaTiO_3-x(Na_{1-y}K_y)NbO_3$, x may satisfy $0.005 \leq x \leq 0.5$.

According to the exemplary embodiment, y may satisfy $0.3 \leq y \leq 1.0$.

When y is 1.0, the second base material main ingredient may be $KNbO_3$.

According to the exemplary embodiment, x satisfies $0.005 \leq x \leq 0.5$, and thus excellent permittivity, high-temperature (150° C.) TCC, high-temperature withstand voltage, and X8R temperature characteristics may be implemented.

Further, when y satisfies $0.3 \leq y \leq 1.0$, permittivity and high-temperature withstand voltage characteristics may be implemented.

An average particle diameter of the base material main ingredient powder is not particularly limited, but may be 1000 nm or less.

b) First Accessory Ingredient

According to an exemplary embodiment, the dielectric ceramic composition may contain one or more elements selected from the group consisting of manganese (Mn), vanadium (V), chromium (Cr), iron (Fe), nickel (Ni), cobalt (Co), copper (Cu), and zinc (Zn), oxides thereof, and carbonates thereof as the first accessory ingredient.

A content of the first accessory ingredient may be 0.1 to 5.0 parts by mole based on 100 parts by mole of the base material main ingredient $((1-x)BaTiO_3-x(Na_{1-y}K_y)NbO_3)$.

The content of the first accessory ingredient may be based on contents of one or more of manganese (Mn), vanadium (V), chromium (Cr), iron (Fe), nickel (Ni), cobalt (Co), copper (Cu), and zinc (Zn) contained in the first accessory ingredient without distinguishing addition forms such as an oxide or carbonate form.

For example, a sum of contents of variable-valence acceptor elements containing one or more of manganese (Mn), vanadium (V), chromium (Cr), iron (Fe), nickel (Ni), cobalt (Co), copper (Cu), and zinc (Zn) contained in the first accessory ingredient may be 0.1 to 5.0 parts by mole based on 100 parts by mole of the base material main ingredient.

The content of the first accessory ingredient and contents of second and third accessory ingredients to be described below, which are relative contents based on 100 parts by mole of the base material main ingredient, may be particularly defined as part by mole of a metal or metalloid (Si) contained in each accessory ingredient. The part by mole of the metal or metalloid may include a part by mole of an ionic metal or metalloid.

In a case in which the content of the first accessory ingredient is 0.1 to 5.0 parts by mole based on 100 parts by mole of the base material main ingredient, a dielectric ceramic composition capable of securing permittivity and TCC characteristics and having excellent high-temperature withstand voltage characteristics may be provided.

In a case in which the content of the first accessory ingredient is less than 0.1 parts by mole, room-temperature resistivity may be decreased, and in a case in which the content of the first accessory ingredient is more than 5.0 parts by mole, permittivity and room-temperature resistivity may be decreased.

The dielectric ceramic composition, according to the exemplary embodiment, may contain the first accessory ingredient having a content of 0.1 to 5.0 parts by mole based on 100 parts by mole of base material powder, and accordingly, permittivity, high-temperature withstand voltage, and TCC characteristics may be implemented.

c) Second Accessory Ingredient

According to the exemplary embodiment, the dielectric ceramic composition may contain one or both selected from the group consisting of $SiO_2$ and glass containing a silicon (Si) element as the second accessory ingredient.

A content of the second accessory ingredient may be 0.1 to 5.0 parts by mole based on 100 parts by mole of the base material main ingredient.

The content of the second accessory ingredient may be based on a content of the silicon (Si) element contained in the second accessory ingredient regardless of addition forms such as an oxide form or glass form.

For example, the content of the silicon (Si) element contained in the second accessory ingredient may be 0.1 to 5.0 parts by mole based on 100 parts by mole of the base material main ingredient.

In a case in which the content of the second accessory ingredient is less than 0.1 parts by mole based on 100 parts by mole of the base material main ingredient of the dielectric ceramic composition, a sintering property may be deteriorated, and in a case in which the content thereof is more than 5.0 parts by mole, high-temperature withstand voltage characteristics may be deteriorated.

d) Third Accessory Ingredient

According to the exemplary embodiment, the dielectric ceramic composition may contain the third accessory ingredient containing one or more selected from the group consisting of yttrium (Y), dysprosium (Dy), samarium (Sm), gadolinium (Gd), holmium (Ho), erbium (Er), and ytterbium (Yb) and salts thereof.

A content of the third accessory ingredient may be 0.2 to 5.0 parts by mole based on 100 parts by mole of the base material main ingredient.

The content of the third accessory ingredient may be based on contents of one or more of yttrium (Y), dysprosium (Dy), samarium (Sm), gadolinium (Gd), holmium (Ho), erbium (Er), and ytterbium (Yb) contained in the third accessory ingredient without regardless of addition forms such as a metal or salt form.

For example, a sum of contents of one or more of yttrium (Y), dysprosium (Dy), samarium (Sm), gadolinium (Gd), holmium (Ho), erbium (Er), and ytterbium (Yb) contained in the third accessory ingredient may be 0.2 to 5.0 parts by mole based on 100 parts by mole of the base material main ingredient.

The salt of the metal contained in the third accessory ingredient is not particularly limited. For example, the salt may be at least one kind selected from the group consisting of oxide, carbonate, chloride, acetate, alkoxide, and nitride.

According to the exemplary embodiment, the third accessory ingredient may serve to prevent reliability of the multilayer ceramic capacitor using the dielectric ceramic composition from being deteriorated.

In a case in which the content of the third accessory ingredient is less than 0.2 parts by mole based on 100 parts by mole of the base material main ingredient, an effect of improving high-temperature reliability may not be sufficiently exhibited, and in a case in which the content thereof is more than 5.0 parts by mole based on 100 parts by mole of the base material main ingredient, high-temperature reliability may be deteriorated, and a sintering temperature may be increased.

Figure 2:
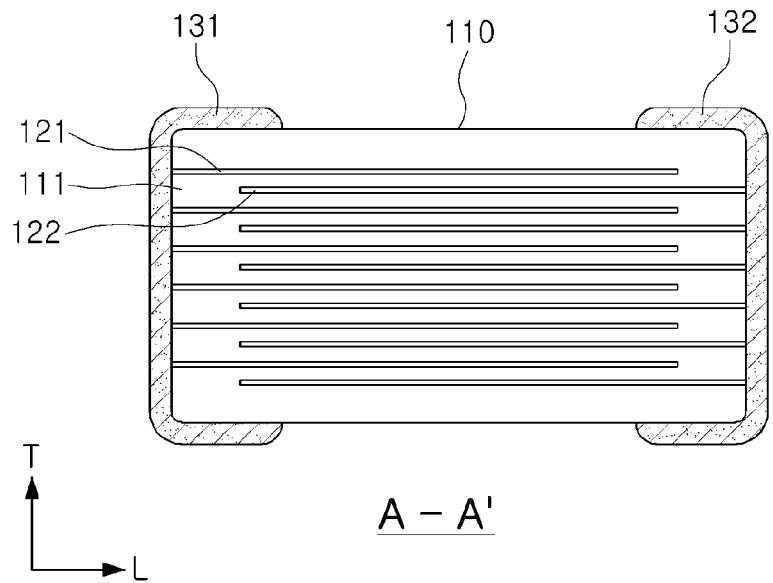
FIG. 2 is a schematic cross-sectional view illustrating the multilayer ceramic capacitor taken along line A-A' of FIG. 1.

FIG. 1 is a schematic perspective view of a multilayer ceramic capacitor according to another exemplary embodiment, and FIG. 2 is a schematic cross-sectional view illustrating the multilayer ceramic capacitor taken along line A-A' of FIG. 1.

Referring to FIGS. 1 and 2, the multilayer ceramic capacitor 100, according to another exemplary embodiment, may include a ceramic body 110 in which dielectric layers 111 and internal electrodes 121 and 122 are alternately stacked. First and second external electrodes 131 and 132 electrically connected to first and second internal electrodes 121 and 122 alternately disposed in the ceramic body 110, respectively, may be formed on opposite end portions of the ceramic body 110.

A shape of the ceramic body 110 is not particularly limited, but may generally be hexahedral. In addition, dimensions of the ceramic body 110 are not particularly limited, and may be appropriately determined depending on the use. For example, the ceramic body may have dimensions of (0.6 mm-5.6 mm)×(0.3 mm-5.0 mm)×(0.3 mm-1.9 mm).

A thickness of the dielectric layer 111 may be optionally changed according to capacitance design of the capacitor. According to the exemplary embodiment, a thickness of a single dielectric layer after sintering may preferably be 0.1 μm or more.

In a case in which the dielectric layer is excessively thin, the number of grains existing in the single dielectric layer is low, which has a negative influence on reliability. Therefore, the thickness of the dielectric layer may be 0.1 μm or more.

The first and second internal electrodes 121 and 122 may be stacked so that end surfaces thereof are exposed to opposite end portions of the ceramic body 110 opposing each other, respectively.

The first and second external electrodes 131 and 132 may be formed on opposite end portions of the ceramic body 110 and electrically connected to the exposed end surfaces of the first and second internal electrodes 121 and 122, thereby configuring a capacitor circuit.

A conductive material contained in the first and second internal electrodes 121 and 122 is not particularly limited, but nickel (Ni) may be preferably used.

A thickness of the first and second internal electrodes 121 and 122 may be appropriately determined depending on the use, or the like, but is not particularly limited. For example, the thickness may be 0.1 μm to 5 μm, or 0.1 μm to 2.5 μm.

A conductive material contained in the first and second external electrodes 131 and 132 is not particularly limited, but nickel (Ni), copper (Cu), or an alloy thereof may be used.

The dielectric layer 111 configuring the ceramic body 110 may contain the dielectric ceramic composition according to the exemplary embodiment.

The dielectric layer 111 configuring the ceramic body 110 may be formed by sintering the dielectric ceramic composition according to the exemplary embodiment.

Since other features of the dielectric ceramic composition are the same as those of the dielectric ceramic composition according to the exemplary embodiment described above, a detailed description thereof will be omitted.

Hereinafter, the present disclosure will be described in detail through Experimental Examples, but the Experimental Examples are to help in the specific understanding of the present disclosure. Therefore, the scope of the present disclosure is not limited thereto.

Experimental Example

A base material main ingredient powder represented by $(1-x)BaTiO_3-x(Na_{1-y}K_y)NbO_3$ was prepared by a solid-state method.

$BaCO_3$, $TiO_2$, $Na_2O$, $K_2O$, and $Nb_2O_5$ were used as starting raw materials and were dispersed and mixed in ethanol at the composition ratio illustrated in Table 1. The mixed powder was calcined in air at 950° C. to 1050° C., thereby preparing the base material main ingredient powder having an average particle size of about 300 nm.

After $MnO_2$ and $SiO_2$ powders were added to the prepared base material main ingredient powder as accessory ingredient additives at the composition ratios illustrated in Tables 1 and 3, raw material powder containing the base material main ingredient and the accessory ingredients was mixed with ethanol/toluene, a dispersant, and a binder using zirconia balls as mixing/dispersing media and then ball-milled for 20 hours.

A sheet having a thickness of 10 μm was manufactured from the prepared slurry using a doctor blade type coater. A nickel (Ni) internal electrode was printed on the sheet. Upper and lower covers were manufactured by stacking 25 cover sheets, and 21 active sheets on which the internal electrode was printed were stacked while being compressed, thereby manufacturing a bar. The compressed bar was cut into chips having a 3216 size (length×width×thickness: about 3.2 mm×1.6 mm×1.6 mm) using a cutter. After the manufactured 3216 size chip was calcined and sintered at 1200° C. to 1350° C. for 2 hours under a reducing atmosphere (0.1% $H_2$/99.9% $N_2$, $H_2O/H_2/N_2$), the sintered chip was heat-treated at 1000° C. for 3 hours under a nitrogen ($N_2$) atmosphere for re-oxidation.

External electrodes were completed by terminating the sintered chip using a copper (Cu) paste and sintering the formed electrodes.

Capacitance, dissipation factors (DF), insulation resistance, temperature coefficients of capacitance (TCC), resistance degradation behaviors depending on a voltage step increase at a high temperature of 150° C., and the like, of prototype multilayer ceramic capacitor (MLCC) samples completed as described above were evaluated.

Room-temperature capacitance and dissipation factors of the multilayer ceramic capacitor (MLCC) chip were measured using a LCR-meter under the conditions of 1 kHz and AC 0.2V/μm. Permittivity of a dielectric material of the multilayer ceramic capacitor (MLCC) chip was calculated from the capacitance, thickness of a dielectric layer, an area of internal electrodes, and the number of stacked dielectric layers.

Room temperature insulation resistance (IR) was measured after 60 seconds in a state in which ten samples each were taken and a DC voltage of 10V/μm was applied thereto.

The temperature coefficient of capacitance (TCC) depending on a temperature was measured in a temperature range from −55° C. to 150° C.

In a high-temperature IR boosting test, the resistance degradation behavior was measured while increasing the voltage step by 5V/μm at 150° C., and a resistance value was measured every 5 seconds, wherein the time of each step was 10 minutes.

The high-temperature withstand voltage was derived from the high-temperature IR boosting test. When the high-temperature withstand voltage was measured by applying the voltage step of DC 5V/μm at 150° C. to a 3216 size MLCC chip for 10 minutes, and continuously increasing the voltage step, the high-temperature withstand voltage indicates a voltage at which IR withstands $10^5 \Omega$ or more, wherein the MLCC chip has 20 dielectric layers having a thickness of 7 μm after sintering at 150° C.

The following Tables 1 and 3 illustrate compositions of the Experimental Examples, and Tables 2 and 4 illustrate characteristics of prototype multilayer ceramic capacitor (MLCC) chips corresponding to the compositions shown in Tables 1 and 3.

TABLE 1

| | Molar Ratio of Each Base Material Main Ingredient $(1-x)BaTiO_3 + x(Na_{1-y}K_y)NbO_3$ | | | The Number of Mole of Each Additive per 100 mole of Base Material | |
|---|---|---|---|---|---|
| | First Base Material | | | Main Ingredient (BT-NKN) | |
| | Main Ingredient | Second Base Material Main Ingredient | | First Accessory | Second Accessory |
| Sample | $BaTiO_3$ $(1-x)$ | $(Na_{1-y}K_y)NbO_3$ $(x)$ | y | Ingredient $MnO_2$ | Ingredient $SiO_2$ |
| 1 | 1.000 | 0.000 | 0.500 | 0.50 | 0.50 |
| 2 | 0.995 | 0.005 | 0.500 | 0.50 | 0.50 |
| 3 | 0.990 | 0.010 | 0.500 | 0.50 | 0.50 |
| 4 | 0.980 | 0.020 | 0.500 | 0.50 | 0.50 |
| 5 | 0.970 | 0.030 | 0.500 | 0.50 | 0.50 |
| 6 | 0.950 | 0.050 | 0.500 | 0.50 | 0.50 |
| 7 | 0.900 | 0.100 | 0.500 | 0.50 | 0.50 |
| 8 | 0.800 | 0.200 | 0.500 | 0.50 | 0.50 |
| 9 | 0.700 | 0.300 | 0.500 | 0.50 | 0.50 |
| 10 | 0.600 | 0.400 | 0.500 | 0.50 | 0.50 |
| 11 | 0.500 | 0.500 | 0.500 | 0.50 | 0.50 |
| 12 | 0.400 | 0.600 | 0.500 | 0.50 | 0.50 |
| 13 | 0.950 | 0.050 | 0.500 | 0.00 | 0.50 |
| 14 | 0.950 | 0.050 | 0.500 | 0.10 | 0.50 |
| 15 | 0.950 | 0.050 | 0.500 | 0.30 | 0.50 |
| 16 | 0.950 | 0.050 | 0.500 | 1.00 | 0.50 |
| 17 | 0.950 | 0.050 | 0.500 | 2.00 | 0.50 |
| 18 | 0.950 | 0.050 | 0.500 | 5.00 | 0.50 |
| 19 | 0.950 | 0.050 | 0.500 | 7.00 | 0.50 |
| 20 | 0.950 | 0.050 | 0.500 | 0.50 | 0.00 |
| 21 | 0.950 | 0.050 | 0.500 | 0.50 | 0.10 |
| 22 | 0.950 | 0.050 | 0.500 | 0.50 | 1.00 |
| 23 | 0.950 | 0.050 | 0.500 | 0.50 | 2.00 |
| 24 | 0.950 | 0.050 | 0.500 | 0.50 | 5.00 |
| 25 | 0.950 | 0.050 | 0.500 | 0.00 | 7.00 |
| 26 | 0.950 | 0.050 | 0.200 | 0.50 | 0.50 |
| 27 | 0.950 | 0.050 | 0.300 | 0.50 | 0.50 |
| 28 | 0.950 | 0.050 | 0.700 | 0.50 | 0.50 |
| 29 | 0.950 | 0.050 | 1.000 | 0.50 | 0.50 |

TABLE 2

Ni-MLCC Proto-type SPL Characteristics
(Permittivity/DF measurement Conditions: AC 0.2 V/um, 1 kHz)
(Room-Temperature Resistivity: DC 10 V/um)

| Sample | Sintering Temperature (° C.) | Room-Temperature Permittivity | DF (%) | Room-Temperature Resistivity (Ohm-cm) | TCC (%) (−55° C.) | TCC (%) (125° C.) | TCC (%) (150° C.) | High-Temperature Withstand Voltage (V/um, 150° C.) | Judgment |
|---|---|---|---|---|---|---|---|---|---|
| 1 | 1250.0 | 3156.0 | 3.520 | 8.221E+12 | −11.7% | −12.4% | −35.2% | 70 | X |
| 2 | 1250.0 | 2766.0 | 3.685 | 8.564E+12 | −12.2% | −11.2% | −15.0% | 70 | 0 |
| 3 | 1250.0 | 2751.0 | 3.580 | 8.623E+12 | −12.4% | −10.4% | −14.5% | 70 | 0 |
| 4 | 1250.0 | 2548.0 | 3.470 | 9.630E+12 | −12.5% | −9.5% | −13.5% | 75 | 0 |
| 5 | 1250.0 | 2477.0 | 3.410 | 1.023E+13 | −12.8% | −9.1% | −12.8% | 70 | 0 |
| 6 | 1250.0 | 2348.0 | 3.260 | 1.174E+13 | −13.2% | −8.8% | −11.8% | 65 | 0 |

TABLE 2-continued

Ni-MLCC Proto-type SPL Characteristics
(Permittivity/DF measurement Conditions: AC 0.2 V/um, 1 kHz)
(Room-Temperature Resistivity: DC 10 V/um)

| Sample | Sintering Temperature (° C.) | Room-Temperature Permittivity | DF (%) | Room-Temperature Resistivity (Ohm-cm) | TCC (%) (−55° C.) | TCC (%) (125° C.) | TCC (%) (150° C.) | High-Temperature Withstand Voltage (V/um, 150° C.) | Judgment |
|---|---|---|---|---|---|---|---|---|---|
| 7  | 1250.0 | 2247.0  | 3.100   | 1.210E+13 | −13.4% | −8.5%  | −10.6% | 65 | O |
| 8  | 1250.0 | 2197.0  | 2.980   | 1.256E+13 | −13.5% | −8.8%  | −10.2% | 65 | O |
| 9  | 1250.0 | 1948.0  | 2.840   | 1.326E+13 | −9.5%  | −6.2%  | −9.8%  | 65 | O |
| 10 | 1250.0 | 1757.0  | 2.640   | 1.335E+13 | −9.2%  | −5.8%  | −9.6%  | 60 | O |
| 11 | 1250.0 | 1548.0  | 2.480   | 1.458E+13 | −8.8%  | −5.6%  | −9.5%  | 55 | O |
| 12 | 1250.0 | 1284.0  | 1.820   | 4.568E+13 | −7.8%  | −5.1%  | −9.2%  | 55 | X |
| 13 | 1250.0 | 21868.0 | 126.500 | 8.480E+07 | —      | —      | —      | 5  | X |
| 14 | 1250.0 | 2568.0  | 4.280   | 5.120E+11 | −13.1% | −9.5%  | −12.5% | 50 | O |
| 15 | 1250.0 | 2437.0  | 4.020   | 7.480E+12 | −12.9% | −9.4%  | −11.7% | 55 | O |
| 16 | 1250.0 | 2296.0  | 2.350   | 8.308E+12 | −12.8% | −2.4%  | −9.8%  | 65 | O |
| 17 | 1250.0 | 1868.0  | 2.260   | 6.335E+11 | −11.6% | −2.3%  | −8.5%  | 65 | O |
| 18 | 1250.0 | 1567.0  | 2.170   | 2.407E+11 | −11.2% | −2.1%  | −8.4%  | 60 | O |
| 19 | 1250.0 | 1365.0  | 1.930   | 7.408E+10 | −10.4% | −1.9%  | −7.7%  | 55 | X |
| 20 | 1300.0 | 2532.0  | 3.990   | 5.688E+12 | −13.7% | −7.9%  | −10.1% | 45 | X |
| 21 | 1270.0 | 2417.0  | 3.840   | 6.408E+12 | −13.6% | −7.8%  | −11.5% | 55 | O |
| 22 | 1240.0 | 2323.0  | 3.120   | 1.245E+13 | −12.8% | −8.4%  | −11.7% | 60 | O |
| 23 | 1250.0 | 2284.0  | 2.990   | 1.070E+13 | −11.8% | −8.6%  | −12.2% | 55 | O |
| 24 | 1270.0 | 2187.0  | 2.970   | 1.123E+13 | −11.7% | −7.4%  | −11.7% | 50 | O |
| 25 | 1290.0 | 2048.0  | 2.880   | 8.887E+12 | −11.4% | −7.6%  | −11.6% | 40 | X |
| 26 | 1250.0 | 1645.0  | 2.830   | 6.208E+12 | −11.8% | −12.5% | −9.9%  | 35 | X |
| 27 | 1250.0 | 1948.0  | 3.030   | 8.450E+12 | −12.3% | −11.1% | −12.7% | 55 | O |
| 28 | 1250.0 | 2046.0  | 1.870   | 8.550E+12 | −10.7% | −10.5% | −15.0% | 55 | O |
| 29 | 1250.0 | 1852.0  | 1.8     | 9.523E+12 | −9.7%  | −6.2%  | −9.9%  | 50 | O |

Samples 1 to 12 of Table 1 indicate Experimental Examples in which a content (1−x) of a first base material main ingredient (BaTiO$_3$, hereinafter referred to as "BT") and a content (x) of a second base material main ingredient (Na$_{1-y}$K$_y$)NbO$_3$, hereinafter referred to "NKN") were changed when in the second base material main ingredient ((Na$_{1-y}$K$_y$)NbO$_3$), y was 0.5 (y=0.5), and contents of a first accessory ingredient (MnO$_2$) and a second accessory ingredient (SiO$_2$) were each 0.5 moles based on 100 moles of the base material main ingredient ((1−x)BaTiO$_3$-x(Na$_{1-y}$K$_y$)NbO$_3$, hereinafter referred to as "BT-NKN"); Table 2 illustrates characteristics of prototype MLCC chips corresponding to Samples 1 to 12. As x was gradually increased from 0 (sample 1) to 0.6 (sample 12), permittivity was gradually decreased. In addition, in a case in which x was 0 (sample 1), permittivity was significantly high (3156), but TCC (150° C.) was −35.2%, and thus the X8R standard (TCC (150° C.)≤±15%) was not satisfied, and in a case in which x was excessively large (x=0.6, sample 12), room-temperature permittivity was excessively decreased (<1500). In samples 2 to 11, room temperature permittivity was 1500 or more, high-temperature withstand voltage was 50V/um or more, and X8R temperature characteristics (TCC (150° C.)≤±15%) were satisfied. Therefore, it may be appreciated that x satisfies 0.005≤x≤0.5.

Samples 13 to 19 of Table 1 indicate Experimental Examples in which the content of the first accessory ingredient (MnO$_2$) was changed when in the second base material main ingredient ((Na$_{1-y}$K$_y$)NbO$_3$), y was 0.5 (y=0.5), the content (x) of the second base material main ingredient in the base material main ingredient was 0.05 (x=0.05), and the content of the second accessory ingredient (SiO$_2$) was 0.5 moles based on the base material main ingredient (BT-NKN); Table 2 illustrates characteristics of prototype MLCC chips corresponding to samples 13 to 19. In a case in which a content of manganese (Mn) was 0 (sample 13), room-temperature resistivity was significantly low (8.480E7 ohm-cm) and in cases in which the content of manganese (Mn) was 0.1 or more (sample 14), it may be confirmed that insulation characteristics (1E11 ohm-cm or more) were implemented. As the content of manganese (Mn) was increased, permittivity and room-temperature resistivity were continuously decreased, and thus in a case in which the content of manganese (Mn) was excessive (7 mol, sample 19), permittivity was 1365 (<1500), and room-temperature resistivity was less than 1E11 ohm-cm. In samples 14 to 18, permittivity, high-temperature withstand voltage, and TCC characteristics satisfied the desired characteristics of the present disclosure. Therefore, a suitable content of manganese (Mn) may be 0.1 to 5 parts by mole based on 100 parts by mole of the base material main ingredient.

Samples 20 to 25 of Table 1 indicate Experimental Examples in which the content of the second accessory ingredient (SiO$_2$) was changed when in the second base material main ingredient ((Na$_{1-y}$K$_y$)NbO$_3$), y was 0.5, the content (x) of the second base material main ingredient in the base material main ingredient was 0.05, and the content of the first accessory ingredient (MnO$_2$) was 0.5 moles based on the base material main ingredient (BT-NKN); Table 2 illustrates characteristics of prototype MLCC chips corresponding to samples 20 to 25. In a case in which a content of SiO$_2$ was 0 (sample 20), a suitable sintering temperature was high (about 1300° C.), and in cases in which SiO$_2$ was added (samples 21 to 24), the sintering characteristics were improved. In a case in which the content of SiO$_2$ was excessive (7 mol, sample 25), there was almost no effect of improving sintering characteristics, and high-temperature withstand voltage was less than 50V/um, and thus the high-temperature withstand voltage characteristics were deteriorated. Therefore, it may be appreciated from the results of Experimental Examples 20 to 25 that at the time of considering permittivity, high-temperature withstand voltage, TCC, and sintering characteristics, a suitable content of silicon (Si) may be 0.1 to 5 parts by mole based on 100 parts by mole of the base material main ingredient.

Samples 26 to 29 of Table 1 indicate Experimental Examples in which a content (y) of potassium (K) and a content (1−y) of sodium (Na) were changed in the second base material main ingredient $(Na_{1-y}K_y)NbO_3$ when the content (x) of the second base material main ingredient $(Na_{1-y}K_y)NbO_3$ in the base material main ingredient was 0.05, the content of the first accessory ingredient $(MnO_2)$ and the content of the second accessory ingredient $(SiO_2)$ were each 0.5 moles based on 100 moles of the base material main ingredient (BT-NKN); Table 2 illustrates characteristics of prototype MLCC chips corresponding to samples 26 to 29. Based on the case in which y was 0.5 in the second base material main ingredient $(Na_{1-y}K_y)NbO_3$, as y was decreased to 0.3 (sample 27) and 0.2 (sample 26), permittivity was decreased, and high-temperature withstand voltage characteristics were deteriorated, and in a case in which y was 0.2 (sample 26), high-temperature withstand voltage was less than 50V/μm. Based on the case in which y was 0.5, as y was increased to 0.7 (sample 28) and 1.0 (sample 29), permittivity and high-temperature withstand voltage characteristics were slightly deteriorated, but permittivity, high-temperature withstand voltage, and TCC characteristics satisfied the desired characteristics of the present disclosure. Therefore, it may be appreciated from the results of Experimental Examples 26 to 29 that at the time of considering permittivity, high-temperature withstand voltage, and room-temperature resistivity, a preferable content (y) of potassium (K) may satisfy $0.3 \leq y \leq 1.0$.

TABLE 3

| | Molar Ratio of Each Base Material Main Ingredient $(1 − x)BaTiO_3 + x(Na_{1−y}K_y)NbO_3$ | | | The Number of Mole of Each Additive per 100 mole of Base Material Main Ingredient (BT−NKN) | | | |
|---|---|---|---|---|---|---|---|
| | First Base Material Main Ingredient | Second Base Material Main Ingredient | | First Accessory | Second Accessory | Third Accessory | |
| | | | | Ingredient | Ingredient | Ingredient | |
| Sample | $BaTiO_3$ (1 − x) | $(Na_{1−y}K_y)NbO_3$ (x) | y | $MnO_2$ | $SiO_2$ | $Y_2O_3$ | $Dy_2O_3$ |
| 30 | 0.950 | 0.050 | 0.500 | 0.50 | 0.50 | 0.00 | 0.00 |
| 31 | | | | | | 0.10 | 0.00 |
| 32 | | | | | | 0.50 | 0.00 |
| 33 | | | | | | 1.00 | 0.00 |
| 34 | | | | | | 1.50 | 0.00 |
| 35 | | | | | | 2.00 | 0.00 |
| 36 | | | | | | 2.50 | 0.00 |
| 37 | | | | | | 3.00 | 0.00 |
| 38 | | | | | | 0.00 | 0.10 |
| 39 | | | | | | 0.00 | 0.50 |
| 40 | | | | | | 0.00 | 1.00 |
| 41 | | | | | | 0.00 | 1.50 |
| 42 | | | | | | 0.00 | 2.00 |
| 43 | | | | | | 0.00 | 2.50 |
| 44 | | | | | | 0.00 | 3.00 |
| 45 | | | | | | 0.25 | 0.25 |
| 46 | | | | | | 0.75 | 0.75 |
| 47 | | | | | | 1.25 | 1.25 |

TABLE 4

Ni-MLCC Proto-type SPL Characteristics
(Permittivity/DF measurement Conditions AC 0.2 V/um 1 kHz)
(Room-Temperature Resistivity: DC 10 V/um)

| Sample | Sintering Temperature (° C.) | Room-Temperature Permittivity | DF (%) | Room-Temperature Resistivity (Ohm-cm) | TCC (%) (−55° C.) | TCC (%) (125° C.) | TCC (%) (150° C.) | High-Temperature Withstand Voltage (V/um, 150° C.) | Judgment |
|---|---|---|---|---|---|---|---|---|---|
| 30 | 1250.00 | 2348.00 | 3.26 | 1.17E+13 | −0.13 | −0.09 | −0.12 | 65.00 | ○ |
| 31 | 1250.00 | 2388.00 | 3.25 | 1.21E+12 | −0.12 | −0.10 | −0.14 | 80.00 | ⊚ |
| 32 | 1250.00 | 2430.00 | 3.31 | 1.31E+12 | −0.12 | −0.11 | −0.15 | 80.00 | ⊚ |
| 33 | 1260.00 | 2510.00 | 3.41 | 1.68E+12 | −0.11 | −0.12 | −0.15 | 85.00 | ⊚ |
| 34 | 1260.00 | 2316.00 | 3.30 | 1.53E+12 | −0.14 | −0.11 | −0.13 | 90.00 | ⊚ |
| 35 | 1270.00 | 2090.00 | 3.12 | 1.67E+12 | −0.13 | −0.09 | −0.12 | 85.00 | ⊚ |
| 36 | 1285.00 | 1984.00 | 3.09 | 1.21E+12 | −0.13 | −0.09 | −0.11 | 80.00 | ⊚ |
| 37 | 1300.00 | 1852.00 | 2.98 | 1.26E+12 | −0.14 | −0.08 | −0.10 | 45.00 | X |
| 38 | 1250.00 | 2410.00 | 3.30 | 1.33E+12 | −0.12 | −0.11 | −0.14 | 80.00 | ⊚ |
| 39 | 1250.00 | 2433.00 | 3.33 | 1.34E+12 | −0.11 | −0.11 | −0.14 | 80.00 | ⊚ |
| 40 | 1260.00 | 2600.00 | 3.43 | 1.46E+12 | −0.10 | −0.13 | −0.15 | 85.00 | ⊚ |
| 41 | 1265.00 | 2367.00 | 3.21 | 1.28E+12 | −0.13 | −0.11 | −0.13 | 90.00 | ⊚ |
| 42 | 1270.00 | 2186.80 | 3.11 | 1.43E+12 | −0.14 | −0.09 | −0.11 | 80.00 | ⊚ |
| 43 | 1285.00 | 2100.00 | 3.01 | 1.40E+12 | −0.15 | −0.09 | −0.11 | 80.00 | ⊚ |
| 44 | 1300.00 | 1857.00 | 2.89 | 1.56E+12 | −0.15 | −0.07 | −0.10 | 40.00 | X |
| 45 | 1260.00 | 2425.00 | 3.21 | 2.13E+12 | −0.13 | −0.10 | −0.13 | 85.00 | ⊚ |
| 46 | 1265.00 | 2510.00 | 3.32 | 1.01E+12 | −0.14 | −0.10 | −0.13 | 90.00 | ⊚ |
| 47 | 1300.00 | 1965.00 | 2.90 | 2.41E+12 | −0.14 | −0.09 | −0.12 | 80.00 | ⊚ |

Sample 30 of Table 3 indicates Experimental Examples in which a content of Y$_2$O$_3$ of a third accessory ingredients was 0 based on 100 moles of the base material main ingredient (BT-NKN), and samples 31 to 37 of Table 3 indicate Experimental Examples in which the content of Y$_2$O$_3$ of the third accessory ingredient was 0.1 to 3.0 moles (a content of yttrium (Y) was 0.2 to 6.0 moles) based on 100 moles of the base material main ingredient (BT-NKN). In addition, Table 4 illustrates characteristics of prototype MLCC chips corresponding to samples 30 to 37.

In a case in which the content of yttrium (Y) was more than 5 moles based on 100 moles of the base material main ingredient (sample 37), it was confirmed that high-temperature withstand voltage was less than 50V/μm (that is, high-temperature reliability was deteriorated), and the sintering temperature was increased.

Samples 38 to 44 of Table 3 indicate Experimental Examples in which a content of Dy$_2$O$_3$ of the third accessory ingredient was 0.1 to 3.0 moles (a content of dysprosium (Dy) was 0.2 to 6.0 moles) based on 100 moles of the base material main ingredient (BT-NKN), and Table 4 illustrates characteristics of prototype MLCC chips corresponding to samples 38 to 44. Similarly to Y$_2$O$_3$, as Dy$_2$O$_3$ was added, high-temperature reliability was improved.

In a case in which the content of dysprosium (Dy) was more than 5 moles based on 100 moles of the base material main ingredient (sample 44), it was confirmed that high-temperature reliability was deteriorated, and the sintering temperature was increased.

Samples 45 to 47 of Table 3 indicate Experimental Examples in which contents of Y$_2$O$_3$ and Dy$_2$O$_3$ of the third accessory ingredient were each 0.25 mol, 0.75 mol, and 1.25 mol, respectively, (contents of yttrium (Y) and dysprosium (Dy) were each 0.5 mol, 1.5 mol, and 2.5 mol) based on 100 moles of the base material main ingredient (BT-NKN); Table 4 illustrates characteristics of prototype MLCC chips corresponding to samples 45 to 47. In Experimental Examples 45 to 47, the results were similar to those in the cases of adding Y$_2$O$_3$ or Dy$_2$O$_3$ alone, and the desired characteristics were also satisfied. However, it was confirmed that as addition amounts were increased, the sintering temperature was further increased. Therefore, when considering high-temperature reliability and secondary effects depending on the sintering temperature, the content of the element of the third accessory ingredient may be 0.2 to 5 parts by mole based on 100 parts by mole of the base material main ingredient.

As set forth above, according to exemplary embodiments, the dielectric ceramic composition and the dielectric material capable of satisfying the X8R temperature characteristics and implementing excellent high-temperature withstand voltage characteristics, and the multilayer ceramic capacitor containing the same, may be implemented.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising a main ingredient of a base material and an accessory ingredient,
    wherein the main ingredient of the base material includes a first main ingredient containing BaTiO$_3$ and a second main ingredient containing (Na$_{1-y}$K$_y$)NbO$_3$,
    the main ingredient of the base material is represented by (1−x)BaTiO$_3$-x(Na$_{1-y}$K$_y$)NbO$_3$, in which x and y satisfy 0.005≤x≤0.5 and 0.3≤y≤1.0, respectively,
    the accessory ingredient includes a first accessory ingredient containing one or more selected from the group consisting of oxides and carbonates of variable-valence acceptor elements containing one or more of manganese (Mn), vanadium (V), chromium (Cr), iron (Fe), nickel (Ni), cobalt (Co), copper (Cu), and zinc (Zn), and a third accessory ingredient containing one or more selected from the group consisting of oxides of one or more of yttrium (Y), dysprosium (Dy), samarium (Sm), gadolinium (Gd), holmium (Ho), erbium (Er), and ytterbium (Yb), and
    a sum of contents of one or more variable-valence acceptor elements of manganese (Mn), vanadium (V), chromium (Cr), iron (Fe), nickel (Ni), cobalt (Co), copper (Cu), and zinc (Zn), contained in the first accessory ingredient, is 0.1 to 5.0 parts by mole based on 100 parts by mole of the main ingredient of the base material.

2. The dielectric ceramic composition of claim 1, wherein the main ingredient of the base material is a solid solution of BaTiO$_3$ and (Na$_{1-y}$K$_y$)NbO$_3$.

3. The dielectric ceramic composition of claim 1, wherein the accessory ingredient further includes at least one of:
    a second accessory ingredient containing one or both selected from the group consisting of SiO$_2$ and glass containing a silicon (Si) element.

4. The dielectric ceramic composition of claim 3, wherein:
    a content of the silicon (Si) element contained in the second accessory ingredient is 0.1 to 5.0 parts by mole based on 100 parts by mole of the main ingredient of the base material, and
    a sum of contents of one or more of yttrium (Y), dysprosium (Dy), samarium (Sm), gadolinium (Gd), holmium (Ho), erbium (Er), and ytterbium (Yb), contained in the third accessory ingredient, is 0.2 to 5.0 parts by mole based on 100 parts by mole of the main ingredient of the base material.

5. The dielectric ceramic composition of claim 1, wherein the accessory ingredient further includes a second accessory ingredient containing one or both selected from the group consisting of SiO$_2$ and glass containing a silicon (Si) element, and
    a content of the silicon (Si) element contained in the second accessory ingredient is 0.1 to 5.0 parts by mole based on 100 parts by mole of the main ingredient of the base material.

6. The dielectric ceramic composition of claim 1, wherein a sum of contents of one or more of yttrium (Y), dysprosium (Dy), samarium (Sm), gadolinium (Gd), holmium (Ho), erbium (Er), and ytterbium (Yb), contained in the third accessory ingredient, is 0.2 to 5.0 parts by mole based on 100 parts by mole of the main ingredient of the base material.

7. A dielectric material formed by sintering the dielectric ceramic composition of claim 1.

8. A multilayer ceramic capacitor comprising:
    a ceramic body in which dielectric layers and internal electrodes are alternately stacked; and
    external electrodes formed on outer surfaces of the ceramic body and electrically connected to the internal electrodes,
    wherein the dielectric layers are formed of a dielectric ceramic composition containing a main ingredient of a base material and an accessory ingredient, the main ingredient of the base material including a first main ingredient containing $BaTiO_3$ and a second main ingredient containing $(Na_{1-y}K_y)NbO_3$, the main ingredient of the base material is represented by $(1-x)BaTiO_3-x(Na_{1-y}K_y)NbO_3$, in which x and y satisfy $0.005 \leq x \leq 0.5$ and $0.3 \leq y \leq 1.0$, respectively, the accessory ingredient includes a first accessory ingredient containing one or more selected from the group consisting of oxides and carbonates of variable-valence acceptor elements containing one or more of manganese (Mn), vanadium (V), chromium (Cr), iron (Fe), nickel (Ni), cobalt (Co), copper (Cu), and zinc (Zn), and a third accessory ingredient containing one or more selected from the group consisting of oxides of one or more of yttrium (Y), dysprosium (Dy), samarium (Sm), gadolinium (Gd), holmium (Ho), erbium (Er), and ytterbium (Yb), and a sum of contents of one or more variable-valence acceptor elements of manganese (Mn), vanadium (V), chromium (Cr), iron (Fe), nickel (Ni), cobalt (Co), copper (Cu), and zinc (Zn), contained in the first accessory ingredient, is 0.1 to 5.0 parts by mole based on 100 parts by mole of the main ingredient of the base material.

9. The multilayer ceramic capacitor of claim 7, wherein the main ingredient of the base material is a solid solution of $BaTiO_3$ and $(Na_{1-y}K_y)NbO_3$.

10. The multilayer ceramic capacitor of claim 8, wherein the accessory ingredient further includes at least one of:

a second accessory ingredient containing one or both selected from the group consisting of $SiO_2$ and glass containing a silicon (Si) element.

11. The multilayer ceramic capacitor of claim 10, wherein:

a content of the silicon (Si) element contained in the second accessory ingredient is 0.1 to 5.0 parts by mole based on 100 parts by mole of the main ingredient of the base material, and a sum of contents of one or more of yttrium (Y), dysprosium (Dy), samarium (Sm), gadolinium (Gd), holmium (Ho), erbium (Er), and ytterbium (Yb), contained in the third accessory ingredient, is 0.2 to 5.0 parts by mole based on 100 parts by mole of the main ingredient of the base material.

12. The multilayer ceramic capacitor of claim 8, wherein the accessory ingredient further includes a second accessory ingredient containing one or both selected from the group consisting of $SiO_2$ and glass containing a silicon (Si) element, and a content of the silicon (Si) element contained in the second accessory ingredient is 0.1 to 5.0 parts by mole based on 100 parts by mole of the main ingredient of the base material.

13. The multilayer ceramic capacitor of claim 8, wherein a sum of contents of one or more of yttrium (Y), dysprosium (Dy), samarium (Sm), gadolinium (Gd), holmium (Ho), erbium (Er), and ytterbium (Yb), contained in the third accessory ingredient, is 0.2 to 5.0 parts by mole based on 100 parts by mole of the main ingredient of the base material.

* * * * *